Oct. 17, 1961

G. C. MAYFIELD 3,004,811

PISTON RING ASSEMBLIES

Filed May 23, 1960

INVENTOR
GEORGE C. MAYFIELD

BY Sutherland, Polster & Taylor
ATTORNEYS.

Oct. 17, 1961  G. C. MAYFIELD  3,004,811
PISTON RING ASSEMBLIES
Filed May 23, 1960  2 Sheets-Sheet 2

INVENTOR
GEORGE C. MAYFIELD

BY Sutherland, Polster & Taylor
ATTORNEYS.

United States Patent Office 3,004,811
Patented Oct. 17, 1961

3,004,811
PISTON RING ASSEMBLIES
George C. Mayfield, Richmond Heights, Mo., assignor to McQuay-Norris Manufacturing Company, St. Louis, Mo., a corporation of Delaware
Filed May 23, 1960, Ser. No. 30,829
7 Claims. (Cl. 309—44)

This invention relates to piston rings of the full floating non-bottoming type primarily for use in internal combustion engines, and more particularly to a piston ring assembly of annular expansible rings and an expander-spacer ring for oil control, which expander-spacer ring has a plurality of annularly related, spring pressed elements so constructed and arranged as to provide predetermined control of the radial pressure directing the expansible rings toward the cylinder wall and predetermined control of the axial pressure directing the expansible rings toward the side wall of the groove in the piston to provide control forces, which forces are balanced and also uniform, and applied in such a manner, as to maintain sensitivity of response in the piston ring assembly. The spring action of the expander-spacer ring is obtained by a spring construction, such as shown in my prior Patent 2,562,675 for Piston Ring Expander, of July 31, 1951.

According to this invention, the piston ring assembly includes a pair of annular expansible rings or rails adapted to be supported on opposite sides of the ring groove in the piston, respectively, in spaced relation therein by an annular expander ring which provides, because of its peculiar construction, the necessary radial and axial control forces on the annular expansible rings to maintain a predetermined sealing pressure between the outer edge of the expansible rings on the cylinder wall and a predetermined sealing pressure between the radial faces of the expansible rings and the side walls of the groove in the piston. This expander ring is a ribbon or strip of spring steel formed as a split ring of the "reverse loop" type with abutting ends which make it a circumferentially compressible spring. Such a circumferential spring will change diameter in response to opposed balanced radial forces, but will float in the piston groove to a position in which such opposed radial forces are balanced. It is consequently termed a full floating, non-bottoming, type of ring. Preferably, although not necessarily, the reverse loops at the outer periphery of the expander ring have greater resilience than those loops at the inner periphery of the ring and flex during changes in circumference to accommodate balanced radial forces overcoming the spring forces in the expander ring to change the diameter of the expander ring by compressing the ring circumferentially. For this reason, these loops are termed the radial control loops or portions of the expander ring. The "reverse loops" at the inner periphery of the expander ring are also springs, but of a different spring rate and used primarily as an axial control for the expansible rings. They are accordingly termed axial control loops or portions of the expander ring for this reason.

The radial control loop portions or loops have notches or vents spaced alternately from opposite edges in a manner substantially the same as shown in my prior patent above identified. This forms a radial control loop of predetermined spring resistance which is uniform because of the uniform cross-sectional area of the portion, and the apex of the loop is utilized to determine the minimum spacing between the outer edges of the expansible rings. In other words, the apices of the loop portions are radial spacers positioned so as to act as spaced circumferentially extending fulcrum points or control points about which the expansible rings may move annularly in response to the action of the axial control portions of the expander ring. The axial control portions of the expander ring have opposed cam surfaces with a line contact at the inner periphery of the expansible rings and act on the edge thereof in such a manner as to exert an axial control force which is dependent upon and proportional to the radial force exerted on said expansible rings by said expander ring, and/or proportional to the angle of inclination selected for the cam surfaces.

It is one of the objects of this invention to provide a full floating non-bottoming type of piston ring assembly which can be designed to fulfill predetermined requirements as to radial bearing pressure between the edges of the ring and the cylinder wall.

It is also an object of this invention to provide a piston ring assembly of the above type which can be designed to maintain axial pressure on the piston rings of a predetermined amount.

It is still another object of this invention to provide a piston ring assembly of the above described type in which the sensitivity of response between the control ring and the piston rings is superior to known products on the market.

It is a still further object of the invention to provide a piston ring assembly with sufficient sensitivity of response in which the forces at a plurality of points for a plurality of purposes is maintained uniform.

The invention is hereinafter described in such full clear and exact terms as will enable one skilled in the art to practice the invention when taken in conjunction with the accompanying drawings in which.

Figure 1:
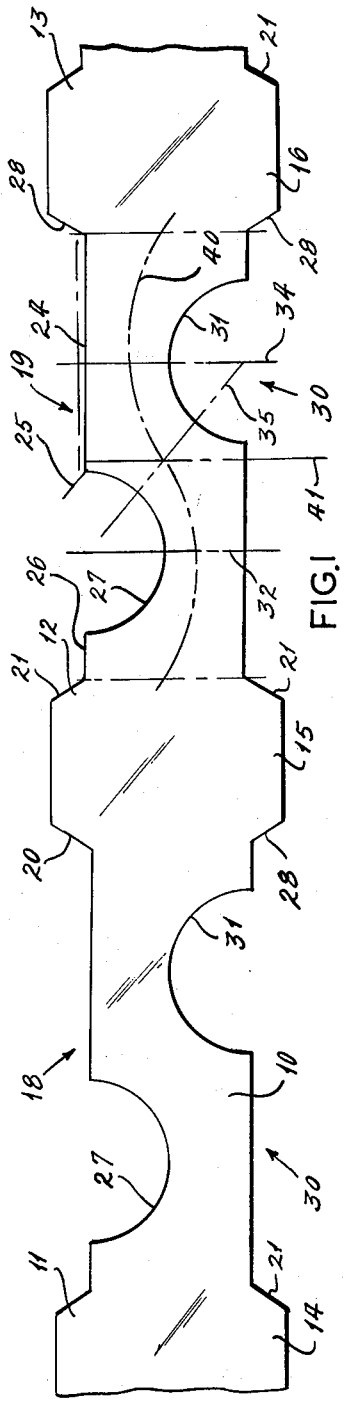
FIG. 1 is a plan view on an enlarged scale of a contoured blank for an expander-spacer ring.

Referring now to FIG. 1, a strip of spring steel, which is in the order of .180 inch wide and .025 inch thick, is subject to a forming operation which notches the edges of the steel strip to form a blank, such as generally indicated at 10, in which each edge of the blank has a repeating pattern. In the blanking operation, a plurality of lugs, such as 11, 12 and 13 are formed on one edge and 14, 15 and 16 are formed on the opposite edge. Lugs 11 and 14 are exactly opposite as are lugs 12 and 15 and 13 and 16. Since each of the lugs is identical, only one will be described. Thus, taking lug 12, for example, this lug is formed by cut-out portions 18 and 19 on either side thereof, which are so shaped as to leave a lug 12 with inclined opposed shoulders 20 and 21. The cut-out 19 leaves a straight edge 24 extending from the shoulder 28 to a medial line 41 between the lugs 12 and 13. The edge 24 is not, however, parallel to the center line of the strip 10, because the cut-out adjacent the medial line 41 between lugs 12 and 13 is not as deep as the portion of the cut-out adjacent the inclined shoulder 28. On the opposite side of the medial line between lugs 12 and 13, the cut-out from the strip 10 is alternately a straight line forming a shoulder 25 continuing from the edge 24, an arcuate edge 27 forming an oil vent and a straight edge 26 to the shoulder 21. Edges 25 and 26 are continuations of a straight edge extending from the lug 12 to the medial line 41 between the lugs 12 and 13, and due to the manner in which the cut-out 19 is made, edge 26 or shoulder 26 is the deeper portion of the cut-out 19. The opposite edge of the strip 10 has a cut-out 30 which is the mirror image of the cut-out 19, this portion of the strip also has an arcuate vent cut-out, indicated as 31. The two cut-outs then, 19 and 30, form between the lugs 11, 12 and 13, etc., on the upper edge and the lugs 14, 15 and 16, etc., on the lower edge portions of the strip of lesser cross-section than at the lugs 12, 13, etc. This then will be the flexible or spring portion of the strip at the cut-outs when later formed into the spacer-expander ring. The cut-outs 19 and 30 together form spaced similar portions in the strip 10, for example, between lugs 12 and 13 and 15 and 16 these portions have a gradually decreasing cross-sectional area from a transverse line at the base of the shoulder 21 to a transverse line 32 through the center of the arcuate cut-out portion 31. Between the transverse line 32 from the center of the arcuate cut-out 27 to a transverse line 34 through the center of the arcuate cut-out 31, the cross-sectional area of the strip 10 can be said to be substantially constant. From the transverse line 34 at the center of the arcuate cut-out 31 to a transverse line at the base of the shoulder 28, the strip 10 has a gradually increasing cross-sectional area. Since the strip 10 is itself springy, then it will be readily recognized that the portion of that spring with the least cross-sectional area extends between a transverse line at the base of the shoulder 21 and a transverse line at the base of the shoulder 28. It follows that this will be the most flexible portion of the strip 10, and since portions of the same kind are alternately spaced between the lugs, a strip is formed with a plurality of relatively flexible spaced portions. The line 40 indicates a line of mean cross-sectional areas between the two shoulders 21 and 28 since it passes through the center of the strip taken on the line 32, 35 and 34 at the midpoint between the edges of the portions of the cut-out 27 and 31. The line 40, as can be seen, is approximately a sine curve illustrating an increase in effective length of the spring loop obtained. As heretofore explained, the cut-outs 19 and 30 vary in depth from the shoulders to a medial line 41 between the shoulders 21 and 28, for example, and it is preferable that the width of the strip on line 41 be 3 to 10 thousandths greater at this intermediate portion than adjacent the shoulders 21 and 28. Since this portion adjacent the medial line 41 is the widest portion, it will become a control point for the rails as will be subsequently pointed out.

Figure 2:
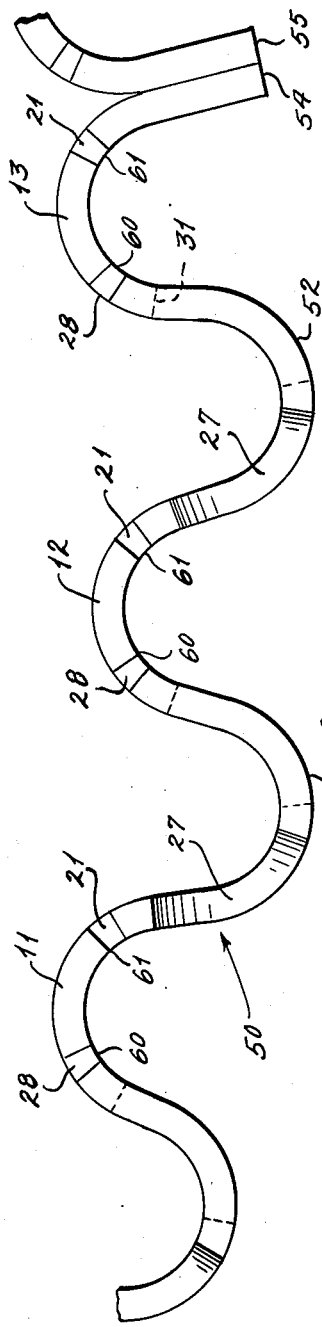
FIG. 2 is a top plan view on an enlarged scale of the contoured blank of FIG. 1 after being formed into an expander-spacer ring.

The strip 10, as heretofore described, is then corrugated and the corrugated strip formed into rings of generally circular shape, such as indicated generally in FIG. 2 as 50. When so formed, the strip 10 becomes an expander-spacer control ring with the lugs 12, 13, 14, etc. on the upper edge of the strip symmetrically located on the inner loops of corrugations, and the portions of the strip 10 with the cut-outs 19 and 30 are located mostly in the outer loops 52 of the corrugated ring 50. Shoulders 21, 28 on the lugs 12, 13, etc. all fall on points of a circle having its center concentric with the center of the spacer-expander ring. Since the ring must be formed split so as to go over the piston, the opposite end thereof 54 and 55 are arranged to come into abutting relation.

Figure 3:
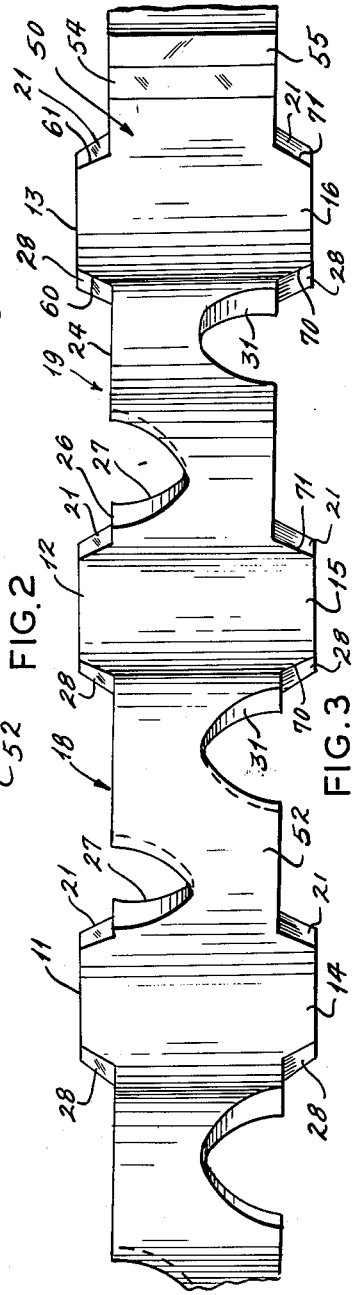
FIG. 3 is a side elevation of the ring shown in FIG. 2 on the same scale.

FIG. 3 is a side elevation taken from the outside of the spacer-expander ring, and as will be seen from this view, the ring comprises a plurality of spaced lugs 12 and 13 which are duplicated about the inner periphery of the ring, each of these lugs has a shoulder 21 and 28, one on either side, which has inclined knife edges 60 and 61, respectively, which when taken collectively all are short projections of a conical surface which is a right circular cone with its center on a line projecting from the center of the ring. The same will be true of the lugs 15 and 16, etc. on the opposite side of the ring. These will have knife edged like control edges 70 and 71. Thus, opposite pairs of lugs, such as 12, 15 and 13, 16, form a portion of the inner loops of the corrugated ring 50, and because of their inclined edge control points 60, 61, 70 and 71, these portions of ring 50 are referred to as axial control loop portions. When the ring 50 is corrugated as above stated, the outer loop portions 52 become the true flexible portions of the control ring 50. When the ring 50 is compressed circumferentially, it is these portions 52 which flex, since they are the portions of the ring with minimum cross-section. Of course, the compression circumferentially in each of the loops 52 will change the radius and diameter of the spacer-expander ring, and, consequently, the portions 52 are referred to as radial control spring loop portions.

Figure 4:
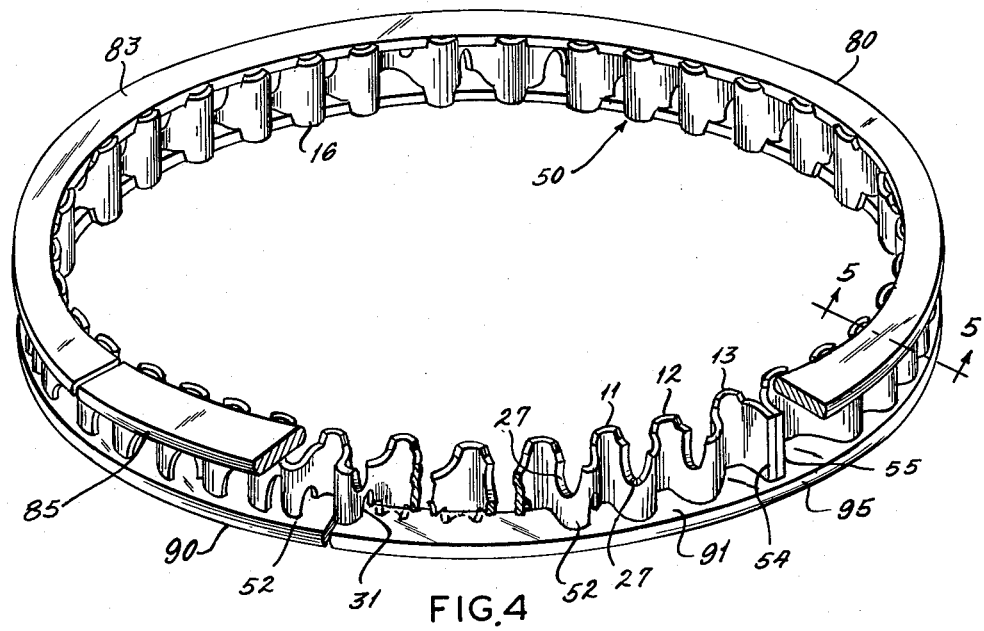
FIG. 4 is a perspective view on an enlarged scale of a piston ring assembly with parts broken away.
Figure 5:
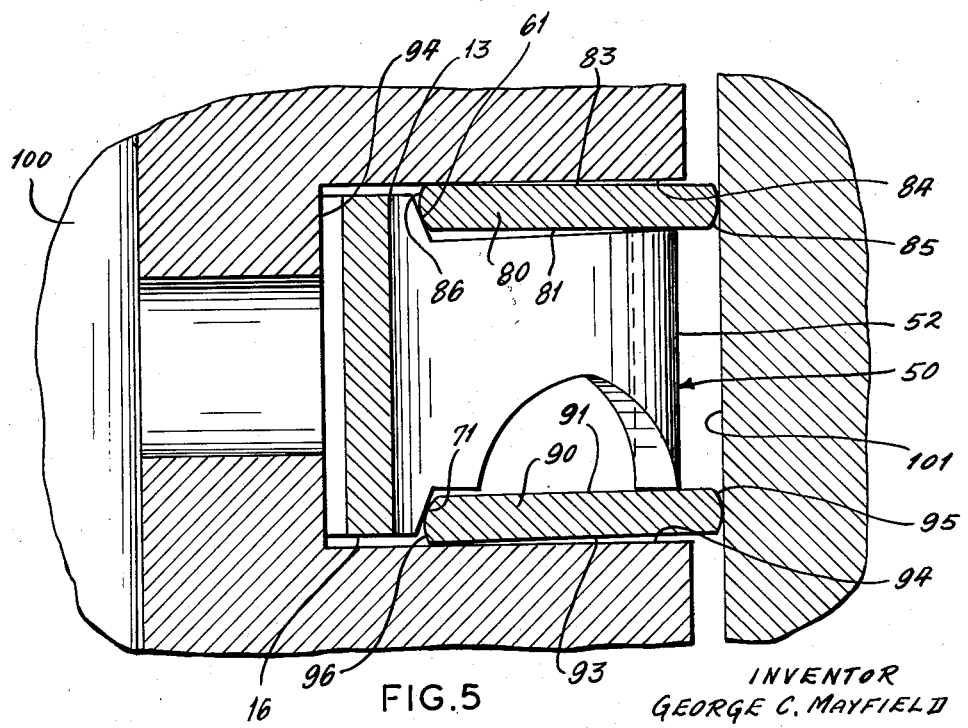
FIG. 5 is a transverse section on an enlarged scale taken on the line 5—5 of FIG. 4 illustrating the operating relationship between the piston ring assembly, piston and cylinder wall.

Turning now to FIG. 4 and FIG. 5, the spacer-expander ring 50 forms the radial and axial control ring for a pair of rails, here indicated as 80 and 90. The inner face 81 of the rail 80 is disposed above the top surface of the radial control spring loop portion 52. The upper face 83 of ring 80 is disposed against the upper radial face 84 of the ring groove in the piston 100. Outer edge 85 of rail 80, is forced against the cylinder wall 101 by contact between the inner edge 86 of rail 80 and the edges 60, 61, one of which is shown. Bottom rail 90 is mounted in the same manner with edge 95 forced against the cylinder wall 101 by edge 71, which is in contact with the rear edge 96 of the rail 90. Opposite faces 91 and 93 of rail 90 are in contact, respectively, with loop portion 52 and the wall of the piston groove 94. The inclined edges 61 and 71 have line contact with the rear edges of the rails 80 and 90 on the rounded surfaces 86 and 96, respectively, and these inclined surfaces are pressed against the rear edges of the rail by the expansive force produced in each of the radial control spring loop portions 52 of the expander spacer. The collective energy in the spaced radial control spring portions 52 determines the radial pressure between the edges 61 and 71 and the rear of the rails 86 and 96, respectively. This in turn determines the radial force exerted between the edge of the rails 85 and 95 and the cylinder wall 101. The inclination of the edges 61 and 71 produce a camming force tending to spread the rails 80 and 90 and force the same against the walls of the piston groove, consequently, edges 61 and 71 can be referred to as axial control cams. The minimum spacing at the outer edge of the rails 85 and 95 is determined by the width of the radial control spring loop portions along the line 41, as heretofore mentioned, and because the cut-outs forming the radial control loops 50 are deeper adjacent the edges 61 and 71, then the contact between rails 80 and 90 will be a point contact at the apex of the radial control spring loop portions 52, this point will become the fulcrum or control point about which the camming action of the edges 61 and 71 takes place. From what has been said heretofore, it will be readily apparent that the action of the expander spacer ring 50 on the rails 80 and 90 is through a plurality of contact points at the edges 61, 71, etc. and at the apex of the radial control spring loop portions 52. This minimizes friction and in effect provides a very sensitive friction free type of control between the spacer-expander 50 and the rails 80 and 90. Since the lugs 13, 16, etc. spaced around the periphery of the ring 50 are located in the inner loop portions of the ring, only the edges 61, 71 will contact the inner periphery of the rails, this gives the so-called knife edge support.

In operation, the piston ring assembly as a whole does not bottom in the groove, consequently, the assembly as a whole will shift to equalize opposite diametrical forces exerted thereon. Furthermore, it should be readily apparent that unlike prior devices the spacer-expander has contact at the rear edge of the rails to exert an axial control force to control the leakage between the rail and the piston, as well as the leakage between the ring and the cylinder wall. The action of the device is essentially a free action, that is, the radial control spring loop portions 52 are not impeded in their exercise of a control action, each loop 52 can expand and contract without interference from the rails since there is only point contact between the spacer portions of the loops 52 and the oppositely located rails, and this point of contact is pivotal rather than sliding. In other words, the legs of the loop move with respect to the contact points top and bottom between the radial control spring loop portion and the rails, and this movement is provided for by the clearance between edge 24 and the top rail and the similar edge in cut-out 30 and the bottom rail.

Since the radial control loop portion does not expand or contract with small changes in circumference of the control ring 50, there is practically no sliding action between the multiplicity of point contacts at the camming surfaces 61, 71, etc. and the inner edge of the rails. The movement about the contact points at the apices of the radial control loops is a rocking motion through a very small angle of movement of the rails on these fulcrum points in response to the action of the cams 61, 71, etc. Normally the only time there will be any substantial sliding action between the apices of the radial control loops and the surface of the rails will be when the ring assembly is compressed during installation of a piston in a cylinder. Under these conditions, the edge 24 in cut-out 19 and the corresponding edge in cut-out 30 form guiding surfaces to eliminate any possibilities of a portion of one of rails 80 or 90 from being caught in vents 27 and 31. This avoids improper installation of the ring.

This ring assembly can be made very light and still perform its intended function. The inner loops reinforce and stiffen the ring transversely to prevent any flexing at this portion. These features together produce a controlled ring action which is highly sensitive to changes in pressure which makes for sensitive control.

Changes in and modifications of the construction described may be made without departing from the spirit of my invention or sacrificing its advantages.

Having thus described the invention, what is claimed and desired to be secured by Letters Patent is:

1. In a piston ring assembly of the character wherein a pair of rails whose outer peripheries make edgewise engagement with a cylinder wall and are axially separated by a non-bottoming spacer-expander, said spacer-expander having a series of oppositely oriented humps some of whose crests define a major diameter, less than the outer diameter of said rails, of said spacer-expander and other of whose crests define a minor diameter less than the inner diameter of said rails, said first mentioned humps extending between said rails to separate the same, at least some of said last mentioned humps having an arcuate tab extending radially inward of said rails in axially overlapping engagement with the inner periphery of one of said rails, the improvement which comprises: the locus of engagement between a tab and a rail being an edge defined by the intersection of two surfaces of the tab each of which surfaces makes a substantial angle with the inner periphery of the engaged rail.

2. The improvement of claim 1 wherein the last mentioned humps have two tabs, one engaging one rail and the other engaging the other rail as defined.

3. In a piston ring assembly of the character wherein a pair of rails whose outer peripheries make edgewise engagement with a cylinder wall and are axially separated by a non-bottoming spacer-expander, said spacer-expander having a series of oppositely oriented humps some of whose crests define a major diameter, less than the outer diameter of said rails, of said spacer-expander and other of whose crests define a minor diameter less than the inner diameter of said rails, said first mentioned humps extending between said rails to separate the same, at least some of said last mentioned humps having an arcuate tab extending radially inward of said rails in axially overlapping engagement with the inner periphery of one of said rails, the improvement which comprises: the locus of engagement between a tab and a rail being an edge extending at a substantial angle to the axis of said engaged rail.

4. In a piston ring assembly of the character wherein a pair of rails whose outer peripheries make edgewise engagement with a cylinder wall and are axially separated by a non-bottoming spacer-expander, said spacer-expander having a series of oppositely oriented humps some of whose crests define a major diameter, less than the outer diameter of said rails, of said spacer-expander and other of whose crests define a minor diameter less than the inner diameter of said rails, said first mentioned humps extending between said rails to separate the same, at least some of said last mentioned humps having an arcuate tab extending radially inward of said rails in axially overlapping engagement with the inner periphery of one of said rails, the improvement which comprises: the humps which define said major diameter having alternately arranged ventilating recesses in the upper and lower margins thereof, said recesses being so disposed that the cross sectional area of the residual material normal to the spring length thereof is substantially constant.

5. In a piston ring assembly of the character wherein a pair of rails whose outer peripheries make edgewise engagement with a cylinder wall and are axially separated by a non-bottoming spacer-expander, said spacer-expander having a series of oppositely oriented humps some of whose crests define a major diameter, less than the outer diameter of said rails, of said spacer-expander and other of whose crests define a minor diameter less than the inner diameter of said rails, said first mentioned humps extending between said rails to separate the same, at least some of said last mentioned humps having an arcuate tab extending radially inward of said rails in axially overlapping engagement with the inner periphery of one of said rails, the improvement which comprises: the locus of engagement between a first mentioned hump and the adjacent rail being an edge defined by intersecting surfaces of said humps neither of which surfaces is parallel with the adjacent surface of the engaged rail.

6. In a piston ring assembly of the character wherein a pair of rails whose outer peripheries make edgewise engagement with a cylinder wall and are axially separated by a non-bottoming spacer-expander, said spacer-expander having a series of oppositely oriented humps some of whose crests define a major diameter, less than the outer diameter of said rails, of said spacer-expander and other of whose crests define a minor diameter less than the inner diameter of said rails, said first mentioned humps extending between said rails to separate the same, at least some of said last mentioned humps having arcuate tabs extending radially inward of said rails in axially overlapping engagement respectively with the inner peripheries of said rails, the improvement which comprises: the locus of engagement between a first mentioned hump and the adjacent rail being an edge defined by intersecting surfaces of said humps neither of which surfaces is parallel with the adjacent surface of the engaged rail, and said edge being located substantially at the crest of said hump.

7. The improvement of claim 6 wherein the locus of engagement between said tabs and said rails is an edge defined by the intersection of two surfaces of a tab each of which surfaces makes a substantial angle with the inner periphery and with the axis of the engaged rail, and wherein said humps which define the major diameter have alternately arranged ventilating recesses in the upper and lower margins thereof, said recesses being so disposed that the cross sectional area of the residual material normal to the spring length thereof is substantially constant.

References Cited in the file of this patent

UNITED STATES PATENTS

| | | |
|---|---|---|
| 2,789,872 | Olson | Apr. 23, 1957 |
| 2,795,469 | Haling | June 11, 1957 |
| 2,833,604 | Hunt | May 6, 1958 |
| 2,893,798 | Olson | July 7, 1959 |